United States Patent [19]
Cricchio

[11] 3,821,199
[45] June 28, 1974

[54] N-DERIVATIVES OF 4-AMINO-4-DESOXY-RIFAMYCIN SV AND PREPARATION

[75] Inventor: Renato Cricchio, Varese, Italy

[73] Assignee: Gruppo Lepetit S.p.A., Milano, Italy

[22] Filed: Jan. 14, 1972

[21] Appl. No.: 217,955

[30] Foreign Application Priority Data
Jan. 18, 1971 Italy.................................. 19460/71

[52] U.S. Cl.......... 260/239.3 P, 424/244, 424/267, 424/274, 424/250, 424/248
[51] Int. Cl....................... C07d 99/02, C07d 99/04
[58] Field of Search............................. 260/239.3 P

[56] References Cited
OTHER PUBLICATIONS
Cricchia et al. "J. Med. Chem." Vol. 14, No. 8, (1971) pp. 721–723.

*Primary Examiner*—Henry R. Jiles
*Assistant Examiner*—Robert T. Bond
*Attorney, Agent, or Firm*—Theodore Post; C. Kenneth Bjork

[57] ABSTRACT

N-derivatives of 4-amino-4-desoxy-rifamycin SV are prepared by reacting in an organic solvent medium rifamycin O with a secondary amine having lower alkyl, lower alkenyl, cycloalkyl, phenyl, cycloalkyl-lower alkyl or phenyl-lower alkyl substituent groups, or wherein a hetero N compound is substituted for the secondary amine, to give the titular compounds which are recovered from the reaction medium in usual ways. The products have antimicrobial activity.

10 Claims, No Drawings

N-DERIVATIVES OF 4-AMINO-4-DESOXY-RIFAMYCIN SV AND PREPARATION

SUMMARY OF THE INVENTION

This invention relates to new antimicrobial compounds. More particularly the invention relates to new rifamycin SV derivatives of the formula wherein Me represents methyl, R and R' independently represent lower alkyl, lower alkenyl, cycloalkyl, phenyl, cycloalkyl-lower alkyl, phenyl-lower alkyl, or taken together form with the nitrogen atom a heterocyclic ring with one or more hetero-atoms, optionally substituted by lower alkyl or lower carbalkoxy groups.

In the inventive compounds, the lower alkyl groups represent straight or branched aliphatic chains containing from 1 to 8 carbon atoms, the lower alkenyl groups contain from 3 to 8 carbon atoms, the aliphatic moiety of the phenyl-lower alkyl groups contain from 1 to 5 carbon atoms, and the cycloalkyl groups contain from 5 to 8 carbon atoms. The heterocyclic moieties are generally represented by fully hydrogentated 5- to 8-membered ring.

In accordance with the present invention, it has been found that rifamycin O can be allowed to react with an amine derivative of the formula $$H-N\begin{matrix}R\\R'\end{matrix}$$

wherein R and R' have the same significance as above, according to the following scheme:

The reaction is performed by reacting one molecular proportion of rifamycin O with about two molecular proportions of the selected amine in an organic solvent at a temperature from about 15° to about 35° C. After a period of time, varying between about 12 and about 120 hours according to the reaction rate, thin layer chromatography on silica gel, using as eluent a mixture $CHCl_3$:MeOH 9:1, shows the disappearance of rifamycin O and the formation of a new product having an Rf lower than that of rifamycin O, together with a moderate quantity of rifamycin B and trace amounts of by-products. The recovery of the end products is effected by evaporating the organic layer and crystallizing the crude products by a suitable organic solvent such as, for example, ethyl acetate or precipitating the same end products from ethyl acetate by addition of another inert organic solvent.

In accordance with these methods a number of N-derivatives of 4-amino-4-desoxy-rifamycin SV can be prepared, representatives of which are listed hereinbelow. This list is not to be considered limitative of the scope of the present invention.

4-dimethylamino-4-desoxy-rifamycin SV
4-(N-methyl-N-benzyl)amino-4-desoxy-rifamycin SV
4-piperidino-4-desoxy-rifamycin SV
4-(4-methylpiperidino)-4-desoxy-rifamycin SV
4-dialkylamino-4-desoxy-rifamycin SV
4-hexamethylenimino-4-desoxy-rifamycin SV
4-dibutylamino-4-desoxy-rifamycin SV
4-dihexylamino-4-desoxy-rifamycin SV
4-dioctylamino-4-desoxy-rifamycin SV
4-dibenzylamino-4-desoxy-rifamycin SV
4-bis(phenethyl)amino-4-desoxy-rifamycin SV
4-pyrrolidino-4-desoxy-rifamycin SV
4-dicyclohexylamino-4-desoxy-rifamycin SV
4-(N-methyl-N-cyclohexyl)-amino-4-desoxy-rifamycin SV
4-(4-phenethyl-1-piperazinyl)-4-desoxy-rifamycin SV
4-(2,6-dimethyl-4-benzyl-1-piperazinyl)-4-desoxy-rifamycin SV
4-heptamethyleneimino-4-desoxy-rifamycin SV
4-[N-ethyl-N-(3-phenylpropyl)]amino-4-desoxy-rifamycin SV
4-bis(2-pentenyl)amino-4-desoxy-rifamycin SV
4-(N-propyl-N-cyclopentyl)amino-4-desoxy-rifamycin SV
4-bis(2,4,4-trimethyl-2-pentenyl)amino-4-desoxy-rifamycin SV
4-[N-methyl-N-(2,4-dimethoxypenethyl)]amino-4-desoxy-rifamycin SV 4-[N-butyl-N-cycloctyl]amino-4-desoxy-rifamycin SV
4-(N-ethyl-N-phenyl)amino-4-desoxy-rifamycin SV
4-[N-butyl-N-(p-chlorophenyl)]amino-4-desoxy-rifamycin SV
4-[N-(3-cyclohexylpropyl)-N-ethyl]amino-4-desoxy-rifamycin SV
4-morpholino-4-desoxy-rifamycin SV
4-(1-piperazinyl)-4-desoxy-rifamycin SV
4-(4-carbethoxy-1-piperazinyl)-4-desoxy-rifamycin SV
4-(4-methyl-1-piperazinyl)-4-desoxy-rifamycin SV
4-(N-hexyl-N-phenethyl)amino-4-desoxy-rifamycin SV
4-(3-propylmorpholino-4-desoxy-rifamycin SV The novel rifamycins of this invention are yellow substances, moderately soluble both in acid medium, such as for example 0.1 N HCl, and in basic medium, such as for instance saturated solutions of $NaHCO_3$. The compounds, on the contrary, are very soluble in several organic solvents like acetone, ethyl acetate, methanol, benzene and chlorinated hydrocarbons. Their structure has been established through physical data, that is proton magnetic resonance (pmr), mass, infrared, ultraviolet and visible spectra. The pmr spectrum of these compounds shows the disappearance of the signals of the -$CH_2$- group of the spirolactonic ring of the rifamycin 0 at 4.7 δ units and the appearance of the new signals due to the 4-amino group.

The mass spectrum of the N,N-dimethyl derivative shows the molecular ion at m/e 724, in accordance with the calculated molecular weight. The infrared spectrum shows the disappearance of the absorption band at 1822 $cm^{-1}$, which is characteristic of the spirolactonic ring of the rifamycin O.

The polarographic analysis does not show the reduction wave ($E_{1/2} = +0.03$ volt) of the system 1,4-quinone ⇌ hydroquinone characteristic of rifamycin of type SV.

The compounds of this invention show a high degree of antimicrobial activity. Particularly remarkable is their activity against *Staphylococcus aureus*, *Streptococcus hemolyticus*, *Diplococcus pneumoniae* and *Mycobacterium tuberculosis*. In representative tests, all of the compounds inhibit in vitro the growth of one or more of the above microorganisms at concentrations ranging from 0.005 to 0.2 γ/ml.

DETAILED DESCRIPTION OF THE INVENTION

The following representative examples describe the manner and process of making and using the invention to enable art-skilled persons to make and use the same and set forth the best mode of carrying out the invention.

Example 1: 4-Dimethylamino-4-desoxy-rifamycin SV

To a solution of 3 g. of rifamycin O in 100 ml. of tetrahydrofuran, 3.5 ml. of an ethanolic solution of dimethylamine are added at room temperature. The solution is kept at the same temperature overnight and then tested by thin layer chromatography to confirm that the reaction is completed. After concentration to dryness, the residue is dissolved in 100 ml. of ethyl acetate and washed twice with 20 ml. of phosphate buffer, pH 7.38. The organic layer is dried and concentrated under reduced pressure to a small volume. The product crystallizes out, and, after chilling is collected, washed with ethyl acetate and dried, yielding 600 mg. of 4-dimethylamino-4-desoxy-rifamycin SV, melting at 167°–78° C. Spectrophotometric data registered in phosphate buffer, pH 7.38 λ max (mμ) 302, ε 18,800; λ max (mμ) 418, ε 22,000.

Example 2: 4-(N-Methyl-N-benzyl)-amino-4-desoxy-rifamycin SV

To a solution of 4 g. of rifamycin O in 150 ml. of tetrahydrofuran, 1.250 g. of N-methyl-benzylamine are added at room tempreature. After 40 hours the reaction is completed and the solution is concentrated to dryness. The residue is dissolved in 10 ml. of chloroform and placed on a column of 200 g. of silica gel, prewashed with chloroform, then eluted with a mixture of chloroform-methanol. The first eluate is discarded, the further eluate is collected, concentrated to dryness, dissolved in 20 ml. of ethyl acetate and poured under agitation into a breaker containing 150 ml. of hexane. The precipitated product is collected and dried, yielding 1 g. of the title compound, melting at 139°–55° C. with decomposition. Spectrophotometric data registered in phosphate buffer, pH 7.38 λ max (mμ) 305, ε 16,600 λ max (mμ) 420, ε 18,400.

Examples 3–15

The products listed in Table I have been prepared using a procedure exactly similar to that used for making the N-methyl-N-benzyl derivative of Example 2.

TABLE I

| Example number | $-N \begin{matrix} R' \\ R \end{matrix}$ | Yield, percent | Melting point, °C. | Spectrophotometric data (d) | | | |
|---|---|---|---|---|---|---|---|
| | | | | λmax. (mμ) | ε | λmax. (mμ) | ε |
| 3 | N(C$_2$H$_5$)(C$_2$H$_5$) | 20 | 176–78 | 305 | 14,840 | 424 | 10,950 |
| 4 | N(C$_3$H$_7$)(C$_3$H$_7$) | 13.5 | b150 | 303 | 16,800 | 420 | 19,800 |
| 5 | N(C$_4$H$_9$)(C$_4$H$_9$) | 20 | 133–36 | 302 | 17,100 | 420 | 19,800 |
| 6 | N(CH$_2$—CH=CH$_2$)(CH$_2$—CH=CH$_2$) | 8.4 | 145–50 | 303 | 16,800 | 418 | 20,000 |

TABLE I—Continued

| Example number | -N(R')(R) | Yield, percent | Melting point, °C. | Spectrophotometric data (d) | | | |
|---|---|---|---|---|---|---|---|
| | | | | λmax. (mμ) | ε | λmax. (mμ) | ε |
| 7 | -N(CH₂-CH₃)(CH₂-C₆H₅) | 25 | ᵇ155-80 | 300 | 17,700 | 416 | 19,800 |
| 8 | N-piperidino | 15 | 165-75 | 302 | 18,600 | 415 | 20,500 |
| 9 | 2-methylpiperidino | 13.5 | 173-80 | 303 | 18,300 | 420 | 19,400 |
| 10 | 4-methylpiperidino | 13.5 | ᵇ178-200 | 304 | 23,600 | 424 | 19,500 |
| 11 | pyrrolidino | 13.5 | 165-74 | 302 | 20,200 | 416 | 19,700 |
| 12 | morpholino | 20 | 170-76 | 303 | 17,200 | 420 | 19,400 |
| 13 | piperazino | 13.5 | 185-90 | 303 | 17,000 | 416 | 15,400 |
| 14 | 4-carbethoxypiperazino | 10 | 162-64 | 303 | 17,500 | 420 | 18,600 |
| 15 | 4-methylpiperazino | 30 | 167-71 | 302 | 17,800 | 420 | 19,000 |

ᵇ Decomposed.
ᵈ Registered in phosphate buffer, pH 7.38.

What is claimed is:

1. A rifamycin SV derivative of the formula

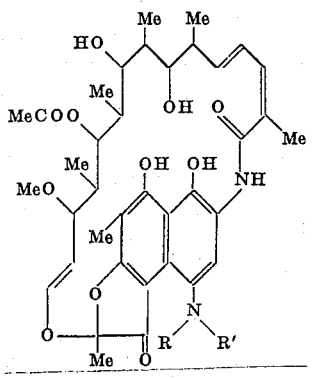

wherein Me represents methyl, R and R' independently represent 1 to 8 carbon atom alkyl, 3 to 8 carbon atom alkenyl, 5 to 8 carbon atom cycloalkyl, phenyl, phenyl-1 to 5 carbon atom alkyl, 5 to 8 carbon atom cycloalkyl- 1 to 8 carbon atom alkyl, or taken together form with the nitrogen atom a heterocyclic ring of the group consisting of piperidino, pyrrolidino, piperazino and morpholino, optionally substituted by a lower alkyl or a lower carbalkoxy group.

2. The compound of claim 1 which is 4-dimethylamino-4-desoxy-rifamycin SV.

3. The compound of claim 1 which is 4-diethylamino-4-desoxy-rifamycin SV.

4. The compound of claim 1 which is 4-piperidino-4-desoxy-rifamycin SV.

5. The compound of claim 1 which is 4-(2-methylpiperidino)-4-desoxy-rifamycin SV.

6. The compound of claim 1 which is 4-(4-methylpiperidino)-4-desoxy-rifamycin SV.

7. The compound of claim 1 which is 4-morpholino-4-desoxy-rifamycin SV.

8. The compound of claim 1 which is 4-(1-piperazinyl)-4-desoxy-rifamycin SV.

9. The compound of claim 1 which is 4-(4-carbethoxy-1-piperazinyl)-4-desoxy-rifamycin SV.

10. A process for making a rifamycin SV derivative of the formula

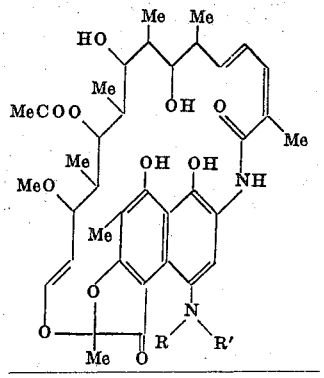

wherein Me represents methyl, R and R' independently represent 1 to 8 carbon atom alkyl, 3 to 8 carbon atom alkenyl, 5 to 8 carbon atom cycloalkyl, phenyl, 5 to 8 carbon atom cycloalkyl- 1 to 8 carbon atom alkyl, phenyl- 1 to 5 carbon atom alkyl, or together with the nitrogen atom form a heterocyclic ring of the group consisting of piperidino, pyrrolidino, piperazino and morpholino, optionally substituted by a lower alkyl or a lower carbalkoxy group, which comprises contacting rifamycin O with an amine of the formula

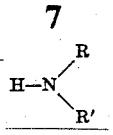
wherein R and R' have the same significance as above
in an organic solvent at a temperature varying from about 15° to 35° C. for a time sufficient to give the said 4-amino substitution, and recovering the said product from the reaction medium.
* * * * *